Dec. 31, 1968  W. ROTH  3,419,877
VIBRATORY RECORDER
Filed Oct. 12, 1966
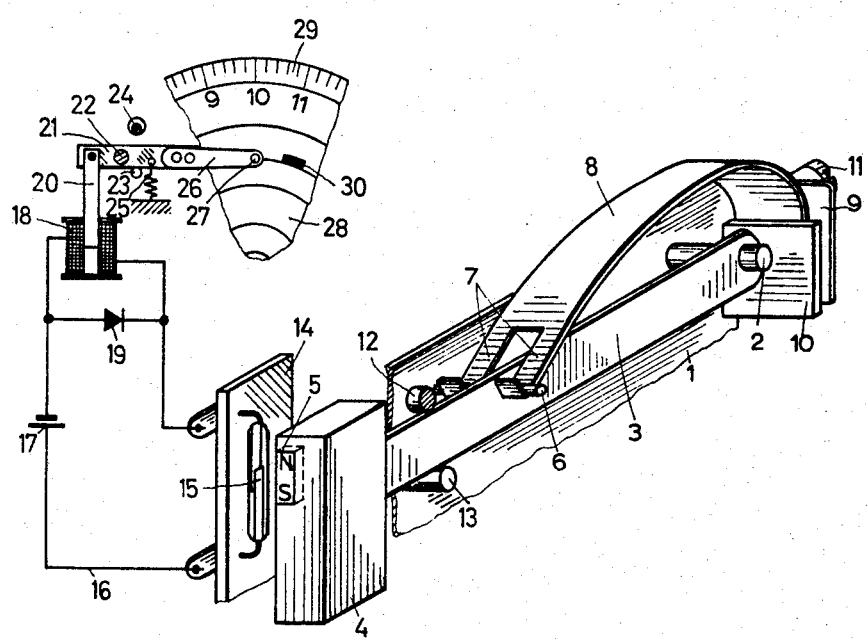
INVENTOR
Werner Roth
By Michael S. Striker
  Attorney United States Patent Office 3,419,877
Patented Dec. 31, 1968

3,419,877
VIBRATORY RECORDER
Werner Roth, 7741 Buchenberg, 152 Dorfle, Germany
Filed Oct. 12, 1966, Ser. No. 586,185
Claims priority, application Germany, Oct. 15, 1965,
K 57,400
10 Claims. (Cl. 346—7)

ABSTRACT OF THE DISCLOSURE

In a vibratory recording instrument a recording arrangement is provided. An electric circuit includes a voltage source, a switch which is adapted to be opened and closed by a magnetic field, and electric actuating means which is connectable to and disconnectable from the source by the switch and is connected with the recording means for operating the same. A support is provided. A vibratory arrangement is mounted on the support so that movements of the support result in vibration of the vibratory arrangement. A magnet is carried by the vibratory arrangement proximal to but out of engagement with the switch and produces, when the vibratory arrangement vibrates, an oscillating magnetic field adjacent the switch which effects opening and closing of the same so that the recording means is correspondingly intermittently actuated.

---

The present invention relates to a vibratory recording instrument, and more particularly to a recording instrument which records a zig-zag line on a moving record carrier surface as long as a motor, machine tool, car or other support of the recording instrument moves.

In this manner, a recorded zig-zag line indicates the duration of a working period during which the support moved, while spaces on the record carrier between the zig-zag lines contain a single line indicating that no vibration has taken place due to the fact that the supporting means did not move.

Known recording instruments serving this purpose have the recording stylus mechanically coupled with a vibratory pendulum which vibrates when its supporting means move, for example if a motor runs, or a car is driven.

Due to the mechanical connection to the recording means, the vibratory means must provide the forces required for overcoming the friction of the recording stylus on the record carrier surface, and also accelerate and decelerate the recording stylus in an oscillatory movement.

Due to this fact, the self-frequency of the vibratory means cannot be freely selected in accordance with the desired frequency of the vibrations. Furthermore, bearings are required for the recording means which are coupled with the vibratory means, so that energy losses are caused by friction, or by the elastic deformation of coupling elements whereby the quality of the obtained recordings is detrimentally affected.

Due to the fact that the vibratory means are mechanically coupled with the recording means, the sensitivity of the instrument cannot be increased beyond a certain point.

For example, if the instrument is mounted on a fork lift having a diesel motor drive, a number of vibrations and oscillations of different kind and frequency are produced which all influence the vibratory recording instrument. However, only those vibrations must be used for controlling the recording instrument which are caused either by the rolling of the vehicle on the ground, or by stacking operations carried out by the fork lift, since only these operations represent working time. However, if a fork lift rolls on a smooth road surface, or on the floor of a factory hall, the produced vibrations are so weak that due to the friction of the mechanical coupling elements and the recording stylus, an irregular zig-zag line, or no zig-zag line at all is recorded.

Since the recordings are automatically read out for determining the actual working times of the controlled machines or vehicles, it is necessary that the amplitude of the zig-zag recording is accurately maintained, and that the zig-zag recording is not interrupted while the machine or vehicle is operated.

It is one object of the invention to overcome the disadvantages of known vibratory recording instruments, and to provide a vibratory recording instrument of high sensibility which reliably operates to record a zig-zag recording during the entire working time of a machine or vehicle.

Another object of the invention is to provide a vibratory recording instrument in which the vibratory means has a low mass and freely responds to very slight vibration of a support, such as a car or machine.

Another object of the invention is to provide a vibratory recording instrument in which the vibratory means is not mechanically coupled with the recording means.

Another object of the invention is to provide a vibratory recording means in which the recording stylus is operated by electric actuating means which are energized and de-energized under the control of vibratory means which are mechanically separated from the recording means.

With these objects in view, the present invention relates to a vibratory recording instrument which is particularly suited for determining the duration of work periods of machines, motors, or vehicles.

One embodiment of the invention comprises a recording device including a recording surface and a recording means, such as a stylus; circuit means including a voltage source, a switch adapted to be opened and closed by a magnetic field, and electric actuating means, for example an electromagnet, connected to and disconnected from the source by the switch, and being connected with the recording means for operating the same; vibratory means mounted on supporting means, such as the frame of a motor or vehicle so that movements of the supporting means causes vibration of the vibratory means; and means operated by the vibratory means for producing an oscillating magnetic field in the region of the switch during vibration of the vibratory means.

The switch responds to the oscillating magnetic field by opening and closing so that the electric actuating means, for example the electromagnet, moves the recording means to record a zig-zag line during vibration of the vibratory means and movements of the supporting means. In this manner, the vibration of the vibratory means is mechanically independent of the movements of the recording means, of the friction encountered by the stylus on the recording surface, and of the friction in coupling elements which are provided between the vibratory means and the recording means in accordance with the prior art.

In the preferred embodiment of the invention, the vibratory means includes a spring biased lever pivotally mounted on the supporting means and having a free end on which a permanent magnet is mounted. During vibration of the lever, the permanent magnet is oscillated and its magnetic field oscillates in relation to the stationary switch so that the same is opened and closed. The switch preferably includes a pair of contacts enveloped by a gas filled housing.

Since the magnetic forces which have to be overcome by the vibratory means are extremely small and do not substantially load the vibratory means, it is possible to select the self frequency of the vibratory means in such a manner that the self frequency is within the range of the frequencies of the vibrations of the moving supporting means during working operations whose durations are to be recorded.

By using the self frequency of the vibratory means for the recording operations, the sensitivity of the recording instruments to vibrations produced by working operations is substantially increased, and consequently the quality of the recording is improved, facilitating the automatic reading out of the record carrier sheet on which the zig-zag recordings are made.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing whose single figure is partly a fragmentary perspective view of a recording instrument according to the invention, and partly an electric circuit diagram.

Referring now to the drawing, a supporting plate 1 is mounted in the housing of the recording instrument which is attached to a motor, machine, or vehicle, not shown. It will be understood that during operations of the motor, machine, or vehicle, vibrations will be produced and transmitted to the supporting plate 1. A pivot 2 is secured to supporting plate 1 and supports a lever 3 for pivotal movement. The free end of lever 3 carries a mass 4 into which a small permanent magnet 5 is inserted. Another insulated support plate 14 carries a switch 15 which has a pair of contacts enveloped by a gas-filled housing. The contacts of the switch are connected with terminals projecting from the rear space of insulating plate 14, and at least one of the contacts has an operating portion located in the magnetic field of permanent magnet 5.

A pin 6 is secured to lever 3 and has projecting portions on opposite sides of the same engaged by bent angular prongs 7 of a leaf spring 8 whose end is clamped between a transverse projection 9 of supporting plate 1, and a clamping plate 10 which is secured to portion 9 by fastening means, such as screws or rivets, not shown.

An adjusting screw 11 is threaded into a bore of the transverse plate portion 9 and has an end, not shown, engaging the outer surface of leaf spring 8 so that the position of the same, and thereby of lever 3, can be adjusted to a normal position of rest in which lever 3 is located between a pair of stops 12 and 13 secured to supporting plate 1.

The stops 12 and 13 are spaced from each other to permit oscillations or vibrations of lever 3 of large amplitude so that only the peaks of the greatest amplitudes are cut off. When supporting plate 1 vibrates due to vibrations of the car, machine, or motor on which the instrument is mounted, the pendulum 3, 4 will vibrate out of the position of rest determined by adjustment of adjusting screw 11 so that permanent magnet 5 performs an oscillating movement relative to the stationary switch 15. Consequently, the magnetic field produced by permanent magnet 5 will oscillate relative to the contacts of switch 15 causing the same to alternate between a circuit closing and a circuit breaking condition at the frequency of the vibrations of the vibratory means 3, 8, 4.

One terminal of switch 15 is connected by a line 16 to a voltage source 17 which is connected with one end of the winding of an electromagnet 18 whose other end is connected to the other terminal of switch 15. A diode 19 is connected in parallel with electromagnet 18.

Electromagnet 18 has a movable plunger armature 20 pivotally connected with a lever mounted on a stationary pivot 22 for angular movement. A spring 25 is connected to lever 21 and to a stationary point of the supporting means of the instrument, and urges lever 21 to turn in clockwise direction into abutting engagement with a stop 23. An adjustable stop 24 including an eccentric turnable member is provided on the other side of lever 21 and limits turning movement of the same in counterclockwise direction.

A resilient extension 26 of lever 21 is secured to the same by rivets, and carries at the end thereof a recording stylus 27 whose point slides on the recording surface of a record carrier sheet 29 of circular configuration. Record carrier sheet 29 is rotated by a clockwork, not shown, to perform one revolution within twelve or twenty-four hours.

When during rotation of record carrier sheet 29 electromagnet 18 is not energized due to the fact that switch 15 is open, spring 25 will hold recording means 21, 26, 27 in the illustrated position abutting stop 23 so that the stylus 27 will draw a circular line on the recording surface of the continuously rotating record carrier sheet 29. When electromagnet 18 is energized, lever 21 will turn about pivot pin 22 to a position abutting stop 24, and the stylus will make a line in substantially radial direction on the record carrier sheet. However, this line will not be exactly radial since the record carrier sheet 29 turns during the movement of the stylus 27.

During working operations of a machine, motor, or vehicle on which the instrument with supporting plate 1 is mounted, the vibratory means 8, 3, 4 will vibrate at a frequency determined by the mass 4 and the spring force of spring 8, and the frequency can be selected by suitably dimensioning these parts to be within the range of vibrations produced by working operations of the checked machine or vehicle.

The oscillation of permanent magnet 5 will cause opening and closing of the contacts of switch 15 at the same frequency, whereby electromagnet 18 will be alternately connected with the voltage source 17, or disconnected from the same. Since electromagnet 18 causes a corresponding rapid oscillation of the recording means 21, 26, 27, a dense zig-zag line will be recorded on the surface of record carrier sheet 29, as shown at 30. When the working operations stop, the vibration ends, and stylus 27 will no longer oscillate so that a circular line is drawn on the record carrier sheet, indicating a period during which the inspected machine did not work. The duration of the working operation can be ascertained by comparing the circumferential length of a zig-zag recording 30 with a circular time scale along the periphery of the record carrier sheet 29.

From the above description it will become apparent that the permanent magnet 5 is operated by the vibratory means 3, 8, 4 to produce an oscillating magnetic field in the region of switch 15 for connecting and disconnecting the contacts of the same at the frequency of the vibrations.

However, the oscillations of the recording means 21, 26, 27 with armature 20 of the electric actuating means 18, are mechanically independent of the vibration of the resilient vibratory means 4, 3, 8. Consequently, the energy transmitted from the moving motor, machine or vehicle to the vibratory means, is not used for operating the recording means 21, 26, 27, the power required for this purpose being supplied by the voltage source 17.

The contacts of switch 15 have overlapping portions defining a contact point at which the two contacts engage are connected to each other when switch 15 closes the circuit. The position of lever 3 with mass 4 and permanent magnet 5 is adjusted by screw 11 so that in a horizontal position of lever 3, permanent magnet 5 is located in relation to the contact point of switch 15 to obtain the above explained alternate closing and opening of the switch.

Contact is made only when the north pole of magnet 5 is opposite one contact blade and the south pole of magnet 5 is opposite the other contact blade of switch 15. To avoid a permanent contact closure, when the vehicle is at standstill, the arrangement of the magnet 5 on the pendulum mass 4 in relation to switch 15 depends not only on the normal horizontal position of the pendulum 4 but also on the position which the pendulum takes up, when the vehicle is in an oblique position. When the vehicle is in a horizontal position the force of the spring 8 and the gravity influencing the pendulum in its horizontal position exactly counter-balance each other. However, when the vehicle is in an oblique position the effective lever arm with which the gravity influences the pendulum 3, 4 in respect of its pivot 2 is shorter, the torque applied by the spring 8 on the pendulum is greater, and the pendulum will therefore be drawn to its stop 12.

As a consequence the magnet 5 must be arranged on the pendulum mass 4 above the contact point of the contact blades when the pendulum arm 3 is in a horizontal position in relation to switch 15, so that a permanent contact closure is avoided in all those positions which the pendulum can take up when the vehicle is at standstill, that means in horizontal position and at the stop 12.

It will be understood that each of the elements described above, or two or more together, may also find a useful application in other types of recording instruments differing from the types described above.

While the invention has been illustrated and described as embodied in a vibratory recording instrument in which the recording means are not mechanically coupled with the vibratory means of the instrument, and in which an electric actuating means provides the power for operating the recording stylus in an oscillating movement, it is not intended to be limited to the details shown, since various modifications and structural changes may be made without departing in any way from the spirit of the present invention.

What is claimed as new and desired to be secured by Letters Patent is:

1. Vibratory recording instrument, comprising, in combination, a recording device including a moving recording surface, and a recording means; circuit means including a voltage source, a switch means adapted to be opened and closed by a magnetic field, and electric actuating means connected to and disconnected from said source by said switch means, and connected with said recording means for operating the same; supporting means; vibratory means mounted on said supporting means so that movement of said supporting means causes vibration of said vibratory means; and means proximal to but out of engagement with said switch means and carried by said vibratory means for unobstructed oscillatory movement relative to said switch means in response to vibrating of said vibratory means for thereby producing an oscillating magnetic field in the region of said switch means during vibration of said vibratory means for effecting opening and closing of said switch means so that said electric actuating means moves said recording means to record a zig-zag line during vibration of said vibratory means and movements of said supporting means, whereby the vibration of said vibratory means is mechanically independent of the movements of said recording means.

2. Recording instrument as defined in claim 1 wherein said means for producing a magnetic field includes a permanent magnet mounted on said vibratory means for vibration therewith, and located adjacent said switch means.

3. Recording instrument as defined in claim 1 wherein said vibratory means includes a lever mounted on said supporting means for pivotal movement about a pivot axis and having a free end, and a curved leaf spring abutting said lever; wherein said means for producing a magnetic field is a magnet mounted on said free end in the region of said switch means; and wherein said curved leaf spring is secured to said supporting means at a point located on the extension of an imaginary line through said pivot axis and an intermediate position of said free end, and on the side of said pivot axis remote from said free end.

4. Recording instrument as defined in claim 1 wherein vibratory means includes resilient means; and wherein said means for producing a magnetic field includes a permanent magnet secured to said vibratory means for vibration therewith and located proximal to said switch means.

5. Recording instrument as defined in claim 4 wherein said vibratory means includes a lever mounted for pivotal movement on said supporting means and having a free end carrying said permanent magnet, and wherein said resilient means is a leaf spring secured to said supporting means and abutting said lever.

6. Recording instrument as defined in claim 5 and including an adjusting screw mounted on said supporting means and engaging said leaf spring for adjusting the tension and position of the same; and stop means located on said supporting means on opposite sides of said lever for limiting the amplitude of the vibrations thereof.

7. Recording instrument as defined in claim 1 wherein said means for producing a magnetic field includes a permanent magnet mounted on said vibratory means for vibration therewith, and located adjacent said switch means; and wherein said switch means includes a pair of contacts and a gas filled housing enveloping said contacts.

8. Recording instrument as defined in claim 1 wherein said switch means includes a pair of contacts, and a gas filled housing enveloping said contacts; and wherein said electric actuating means includes an electromagnet having an armature connected with said recording means.

9. Recording instrument as defined in claim 1 wherein said switch means includes a pair of contacts disposed in a vertical position and having overlapping contact portions forming a contact point in the circuit closing position of said switch means; and wherein said vibratory means has a horizontal position in which said means for producing a magnetic field is located slightly above said contact point of said overlapping contact portions.

10. Recording instrument as defined in claim 9 wherein said vibratory means includes a lever having one end mounted for pivotal movement on said supporting means and a free end located in the region of said switch means, a mass mounted on said free end, and a spring biasing said lever to assume a normal horizontal positions; and wherein said means for producing a magnetic field includes a permanent magnet secured to said mass and located in said normal horizontal position of said lever slightly above said contact point.

References Cited

UNITED STATES PATENTS

| | | | |
|---|---|---|---|
| 1,041,252 | 10/1912 | Dougherty | 346—7 |
| 1,397,525 | 11/1921 | Kennedy | 346—7 |
| 1,992,134 | 2/1935 | Toewe | 346—7 |
| 3,030,804 | 4/1962 | Riegger | 73—114 |
| 3,249,713 | 5/1966 | Briggs | 335—205 |
| 3,271,708 | 9/1966 | McCormick | 335—205 |

RICHARD B. WILKINSON, *Primary Examiner.*

JOSEPH W. HARTARY, *Assistant Examiner.*

U.S. Cl. X.R.
346—123; 335—205